(12) United States Patent
Turner et al.

(10) Patent No.: US 7,956,600 B2
(45) Date of Patent: Jun. 7, 2011

(54) PROBE WITH WINDINGS WOUND AROUND EACH OTHER

(75) Inventors: Nigel Turner, Hampshire (GB); David Yeomans, Hampshire (GB); Chris D. Maunder, Hampshire (GB); David J. Moon, Hampshire (GB)

(73) Assignee: Weston Aerospace Limited, Farnborough, Hampshire (GB)

( * ) Notice: Subject to any disclaimer, the term of this patent is extended or adjusted under 35 U.S.C. 154(b) by 1 day.

(21) Appl. No.: 12/292,698

(22) Filed: Nov. 24, 2008

(65) Prior Publication Data
US 2009/0189598 A1 Jul. 30, 2009

(30) Foreign Application Priority Data

Jan. 29, 2008 (GB) .................................. 0801590.1

(51) Int. Cl.
*G01P 3/48* (2006.01)
(52) U.S. Cl. .................................. 324/173; 324/207.15
(58) Field of Classification Search ............. 324/207.18, 324/207.15, 207.16, 207.17, 173
See application file for complete search history.

(56) References Cited

U.S. PATENT DOCUMENTS

| 3,876,927 A | 4/1975 | Gee et al. |
| 4,300,022 A | 11/1981 | Hastings-James et al. |
| 4,443,724 A | 4/1984 | Handlykken |
| 4,739,260 A | 4/1988 | Proctor |
| 4,829,834 A * | 5/1989 | Masom ...................... 73/862.326 |
| 5,061,896 A * | 10/1991 | Schmidt .................... 324/207.18 |
| 5,572,119 A * | 11/1996 | Taylor ....................... 324/207.16 |
| 7,148,679 B2 | 12/2006 | Proctor |
| 7,847,543 B2 * | 12/2010 | Grno ............................. 324/253 |
| 2003/0117249 A1 | 6/2003 | Klenk |
| 2003/0222641 A1 | 12/2003 | Proctor |
| 2005/0083040 A1 | 4/2005 | Proctor |
| 2008/0197837 A1 * | 8/2008 | Dulac ....................... 324/207.16 |

FOREIGN PATENT DOCUMENTS

JP 1-308533 12/1989

OTHER PUBLICATIONS

Dictionary definition for the phrase "each other", The American Heritage College Dictionary, 4th Edition, p. 439, year 2002.*
UK Search Report dated Apr. 22, 2008 for GB 0801590.1.

* cited by examiner

*Primary Examiner* — Melissa J Koval
*Assistant Examiner* — David M. Schindler
(74) *Attorney, Agent, or Firm* — Nixon & Vanderhye P.C.

(57) ABSTRACT

A probe with plural output channels for sensing the movement of a body of magnetic material. The probe includes a magnetically energizable pole piece and a plurality of electrically conductive circuits, coupled to the magnetic pole piece, such that a change in magnetic flux in the pole piece caused by movement of the body relative to the pole piece induces a voltage in each of the circuits. The electrically conductive circuits are wound around each other in a symmetrical fashion such that in the vicinity of the magnetic pole piece each circuit experiences substantially the same change in magnetic flux. A probe of this type provides a plurality of substantially identical output signals and is easy to manufacture and replicate.

9 Claims, 2 Drawing Sheets

PROBE WITH WINDINGS WOUND AROUND EACH OTHER

BACKGROUND OF THE INVENTION

1. Field of the Invention

The present invention relates to a probe for detecting the movement of a magnetic element, the probe having a plurality of output channels.

2. Discussion of Prior Art

The use of a magnetic sensor in cooperation with one or more projections on a shaft to give an output from which shaft rotational speed may be determined is well known. In a sensor of this type a coil forming part of an electric circuit is wound around a magnetically energised pole piece. A voltage is induced in the coil by changes in the magnetic flux pattern associated with the pole piece, caused by the relative movement of a projection made of magnetic material in the proximity of the pole piece. The resulting voltage signal can be analysed to determine the rotational speed of the shaft.

U.S. Pat. No. 7,148,679, the contents of which are incorporated herein by reference, discloses a magnetic sensor of this type, which includes a transformer coupled to the coil for detecting the induced voltage. The use of a transformer allows the primary circuit to have one or a few turns on the pole piece. These turns generate a low voltage signal, which is transformed to a high output voltage at the secondary coil of the transformer.

In some circumstances it is desirable to provide sensor redundancy. One such circumstance is when using a sensor to accurately measure the engine speed of a gas turbine engine in an aircraft. Almost all aircraft components are provided in duplicate or triplicate to provide backup in the event of a component failure. For a measurement as important as engine speed it is essential to have a backup.

FIG. 1 illustrates a magnetic sensor having three output channels A, B, C. Each output channel is provided as a primary winding 10 around a common magnetic pole piece 11. The pole piece is coupled to a permanent magnet 12. Each winding is part of a separate circuit. A toothed wheel 13, called a phonic wheel, is located on the engine drive shaft (not shown), or is coupled to it, and rotates as the engine shaft rotates. The pole piece 11 is located close to the rotating phonic wheel 13. The teeth on the phonic wheel are formed from a magnetic material i.e. a material with a magnetic permeability substantially greater than air, and are typically formed from a ferromagnetic material. Movement of the phonic wheel relative to the pole piece results in a change in the magnetic flux experienced by each of the windings, which in turn induces the voltage in each of the output circuits. The induced voltage is detected as a periodic signal in a secondary transformer circuit 14, from which the speed of the wheel can be determined.

The problem with this design is that each of the output channels provides a different magnitude of signal as a result of the different physical positions of the primary windings around the pole piece. Each of the windings will experience a different rate of change of magnetic flux as a result of the movement of the magnetic elements on the phonic wheel. There is a higher degree of magnetic flux change closer to the phonic wheel and therefore the primary coil positioned at the front of the pole piece produces a higher output compared to those positioned further back. It is important that each channel receives the same signal magnitude, as, when a channel is switched because of a coil failure, the electronics should see the same minimum signal amplitude. If the new signal amplitude is much smaller it might not be detected. One solution would be to design the electronics for the weakest signal, but in this case the strongest signal might be too strong at the highest speed and would have to be attenuated.

In the past, the outputs have been balanced by varying the number of turns on the primary coils. But this is not an easy thing to do, as there are a relatively low number of turns (typically one to four) to adjust. Accordingly, it sometimes requires control of the number of turns down to a half turn and additionally accurate positioning of the start and finish of the primary coil on the pole piece. This method of matching the output is technically difficult, time consuming and not always successful.

SUMMARY OF THE INVENTION

The present invention provides a probe as defined in the appended claims, to which reference should now be made. The present invention provides a probe having a plurality of output signals of equal magnitude that is simple to manufacture and simple to replicate. Preferred features of the invention are defined in the dependent claims.

BRIEF DESCRIPTION OF THE DRAWINGS

Embodiments of the invention will now be described in detail, with reference to the accompanying drawings, in which.

DETAILED DISCUSSION OF EMBODIMENTS

Figure 1:
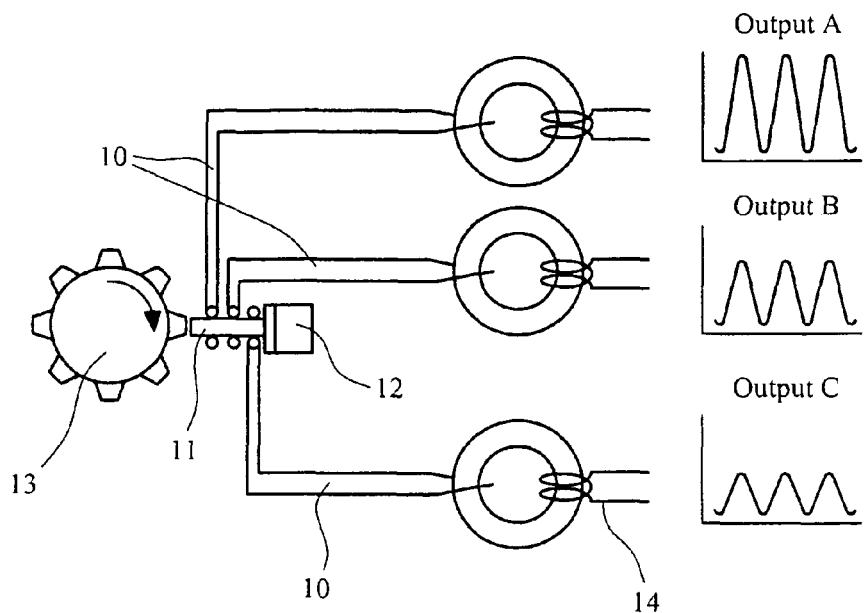
FIG. 1 is a schematic diagram of a multiple channel variable reluctance speed sensor in accordance with the prior art.
Figure 2:
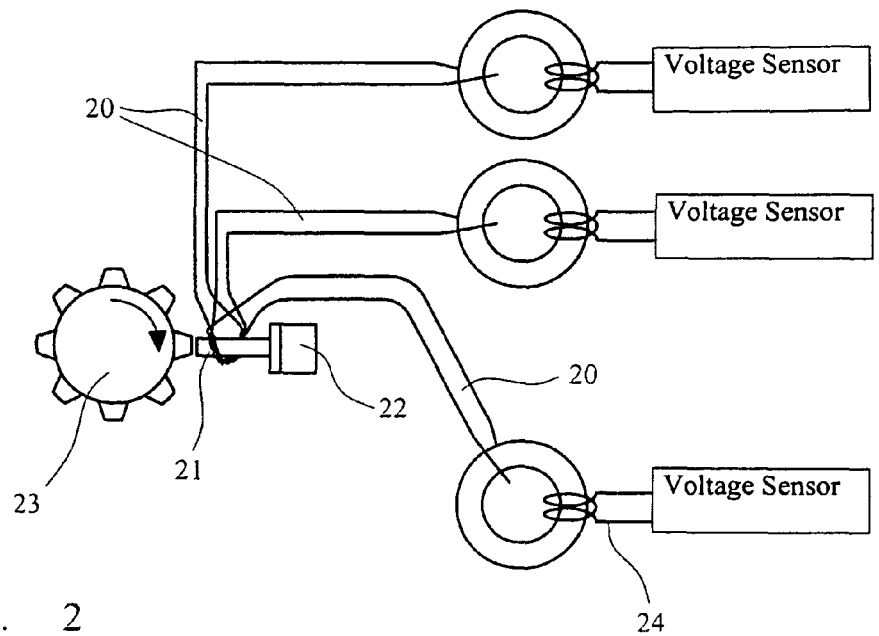
FIG. 2 is a schematic diagram of a multiple channel variable reluctance speed sensor in accordance with the present invention.

FIG. 2 is a schematic illustration of a three-channel speed sensing probe in accordance with the present invention. The probe is similar to that illustrated in FIG. 1. The probe comprises three primary output circuits having primary windings 20 wound around a pole piece 21. The pole piece 21 is coupled to a permanent magnet 22 and is located close to a phonic wheel 23. The primary output circuits are each wound around separate secondary transformer cores. The outputs are detected in secondary transformer circuits 24.

However, a probe in accordance with the present invention differs from that shown in FIG. 1 in that each of the windings 20 around the pole piece 21 are also wound around each other. By winding each of the output circuits around each other in the vicinity of the pole piece each of the output circuits experience substantially the same change in magnetic flux resulting from passage of the toothed wheel past the pole piece. Accordingly, the induced voltage in each of the output circuits is the same. Provided that the output circuits and secondary transformers are identical to each other in all other respects, the output signals produced by each channel will be substantially identical.

Each of the output channels 20 is electrically independent from each other output channel as the primary circuits are insulated from one another. The primary circuits are typically formed of a flexible wire, such as copper wire of diameter of 1-2 mm and are covered in an insulating jacket formed, for example, from enamel. The insulating jacket is provided on the wires at least in the area in which they are wound around each other.

In the embodiment shown in FIG. 2 there are three output channels. However, any desired number of output channels may be provided in the same manner.

Figure 3A:
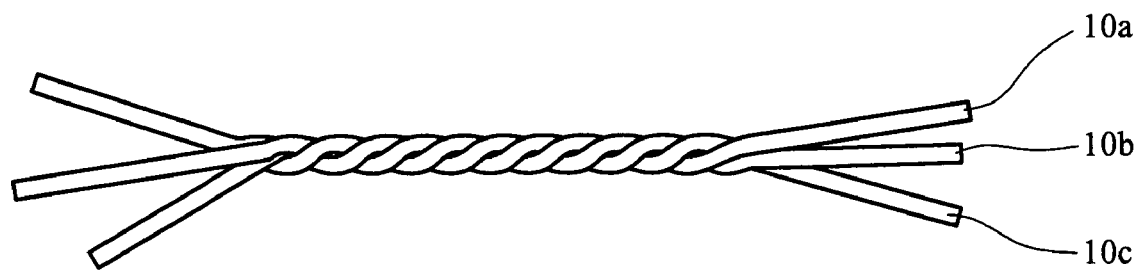
FIG. 3a illustrates winding of three output circuits around each other in accordance with the present invention.

FIG. 3a shows the winding of the primary circuits 10a, 10b, 10c around each other in greater detail. Primary circuits are wound around each other in a symmetrical fashion so that, on average, each of the primary circuits is equidistant from the phonic wheel and so is subject to the same change in magnetic flux density. No one circuit is positioned nearer the phonic wheel than the others. In the example shown, the wires of the primary circuits are simply twisted together. However, it is possible to braid or plait the wires together.

Figure 3B:
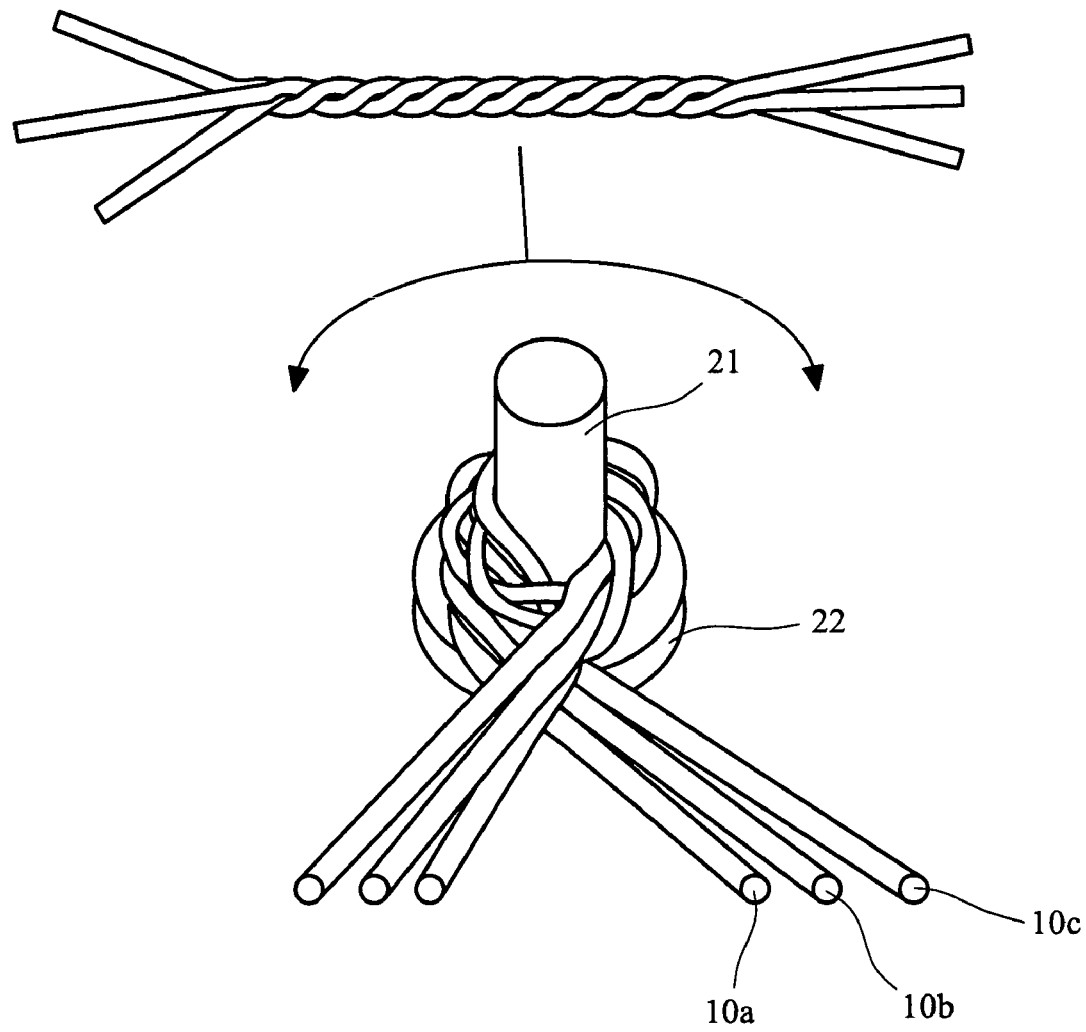
FIG. 3b illustrates the winding of the output circuits around a pole piece.

FIG. 3b shows how the twisted bundle of primary wires may be wound around the pole piece. In FIG. 3b the bundle is wound around the pole piece to form two turns. The length over which the primary circuits 20 are wound around each other depends on the dimensions of the pole piece 21 and on the number of turns around the pole piece that are required. The dimensions of each of the primary circuit wires and the desired number of twists around each other may also contribute to the length over which they are twisted together. For a good degree of uniformity, for n wires there must be at least n twist periods per circumference of the pole piece. The position of the bundle on the pole piece will affect the magnitude of the output signals and can be chosen to be close to the tip of the pole piece to maximise the output signal.

The output circuits are twisted together before winding them around the pole piece as shown in FIG. 3b. In this manner the sensor can be produced in a significantly shorter time than a sensor of the type shown in FIG. 1. The sensor of the present invention can also be reproduced more accurately than a sensor of the type shown in FIG. 1 due to less variation in the pole winding process. Individual coils do not need to be separately wound around the pole piece. Winding around the pole piece only occurs once.

The invention claimed is:

1. A probe for sensing movement of a body of magnetic material comprising:
   a magnetically energisable pole piece;
   a plurality of electrically conductive circuits coupled to the magnetic pole piece such that a change in magnetic flux in the pole piece caused by movement of the body relative to the pole piece induces a voltage in each of the circuits, wherein the plurality of electrically conductive circuits are wound around each other in the vicinity of the magnetic pole piece such that each circuit experiences substantially the same change in magnetic flux; and
   means for sensing the voltage induced in each circuit.

2. The probe according to claim 1, wherein the means for sensing the voltage induced in each circuit is a secondary transformer coupled to each circuit.

3. The probe according to claim 1 wherein the electrically conductive circuits are electrically insulated from each other.

4. The probe according to claim 1, wherein the electrically conductive circuits are wound around each other in a symmetrical fashion.

5. The probe according to claim 4, wherein the electrically conductive circuits are twisted together.

6. The probe according to claim 1, wherein the electrically conductive circuits are substantially identical to each other.

7. The probe according to claim 1, wherein the plurality of electrically conductive circuits includes "n" conductive circuits, where "n" is an integer greater than one, wherein the "n" conductive circuits are wound around the pole piece "m" times, where "m" is an integer, and wherein the conductive circuits are wound around each other at least "n"×"m" times.

8. A probe for sensing movement of a body of magnetic material, comprising:
   a magnetically energisable pole piece;
   a plurality of electrically conductive circuits coupled to the magnetic pole piece such that a change in magnetic flux in the pole piece caused by movement of the body relative to the pole piece induces a voltage in each of the circuits, wherein the plurality of electrically conductive circuits are wound around each other in the vicinity of the magnetic pole piece such that each circuit experiences substantially the same change in magnetic flux; and
   a voltage sensor for sensing the voltage induced in each circuit.

9. A probe for sensing movement of a body of magnetic material, comprising:
   a magnetically energisable pole piece;
   "n" electrically conductive circuits, where "n" is an integer greater than 1, coupled to the magnetic pole piece, such that a change in magnetic flux in the pole piece caused by movement of the body relative to the pole piece induces a voltage in each of the conductive circuits, wherein the conductive circuits are each wound around the pole piece "m" times, where "m" is an integer, and wherein the conductive circuits are wound around each other in the vicinity of the pole piece at least "n"×"m" times, and
   a voltage sensor for sensing the voltage induced in each circuit.

* * * * *